Jan. 17, 1933. J. A. BARTLEY 1,894,550
COASTING SLED
Original Filed April 4, 1930 2 Sheets-Sheet 1
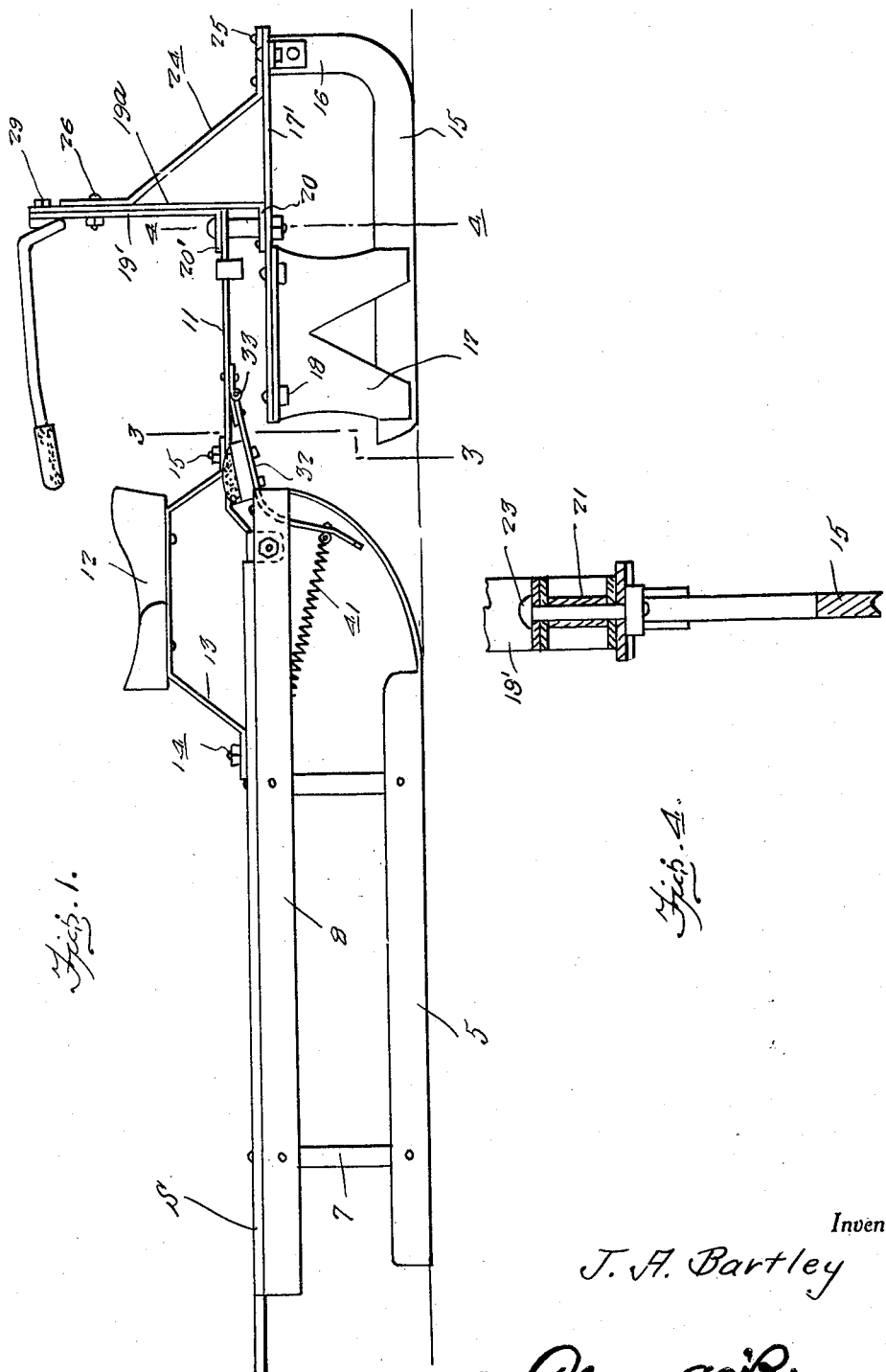
Inventor
J. A. Bartley
By Clarence A. O'Brien
Attorney

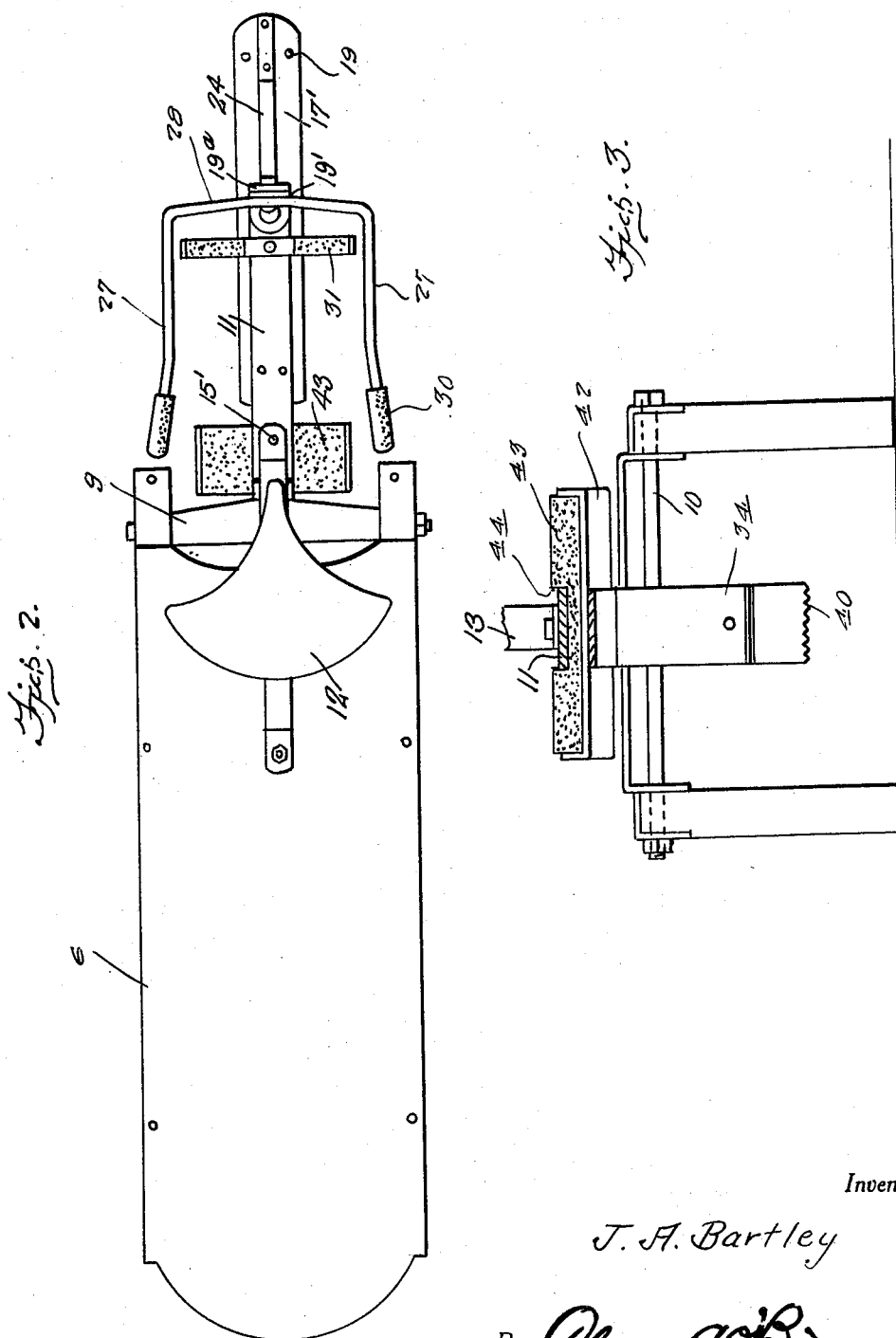

Patented Jan. 17, 1933

1,894,550

UNITED STATES PATENT OFFICE

JOSEPH A. BARTLEY, OF CHARLESTON, WEST VIRGINIA, ASSIGNOR OF ONE-HALF TO W. M. THOMAS

COASTING SLED

Application filed April 4, 1930, Serial No. 441,634. Renewed June 14, 1932.

This invention relates to certain new and useful improvements in coasting sleds, and the primary object of the invention is to provide a coasting sled whereby the same is provided with suitable steering apparatus together with a suitable braking mechanism whereby the sled may be at all times under the control of the operator of the sled.

A still further object of the invention is to provide a sled of the character above mentioned which will be comparatively simple in construction, thoroughly reliable, practical, may be manually steered by the operator and further provided with suitable means for controlling the speed of the sled.

With the above and numerous other objects in view, the invention consists in the novel combination, arrangement of parts and details of construction to be hereinafter more fully set forth and claimed, reference being had to the accompanying drawings, wherein:

Figure 1 is a side elevation of my improved coasting sled,

Figure 2 is a top plan view thereof,

Figure 3 is a detail sectional view taken substantially on the line 3—3 of Figure 1, Figure 4 is a fragmentary detail view taken substantially on the line 4—4 of Figure 1.

With reference more in detail to the drawings it will be seen that the sled is designated generally by the reference character S and that the same may be of any suitable construction as to embody suitable runners 5 and a suitable platform or body 6 supported on the runners through the medium of suitable supports 7.

Forwardly of the sled between the side bars 8 of the sled is a cross bar 9 which connects the forward ends of the bars 8 through the medium of an elongated connecting bolt 10 as clearly shown to advantage in Figure 3. The cross bar 9 intermediate its ends is provided with a forwardly extending bar forming a tongue 11. A seat 12 is suitably supported at the forward end of the sled S through the medium of a substantially U-shaped supporting bracket 13, one leg of which is suitably bolted to the platform 6, as at 14 and the other leg of which is suitably bolted as at 15 to the extension or tongue 11.

A suitable steering apparatus for the sled comprises a steering runner 15 at its forward end terminating in an upstanding extension 16. At its rear end the runner 15 has formed integral therewith a vertically disposed support or bracket plate 17, the upper edge of which terminates on a line with the upstanding end 16 of the steering runner.

A supporting bar 17' is suitably bolted as at 18 to the vertical bracket plate 17 and to the upper end of the extension 16 as at 19.

A post or standard preferably in the nature of a flat sheet of metal and designated by the reference character 19a rises from an intermediate portion of the horizontally disposed bar 17'. At its lower end the post 19a is provided with an inwardly directed extension 20 which is suitably apertured to aline with an aperture in the intermediate portion of the horizontal bar 17'.

The end of the tongue or extension 11 is also apertured and the said free end of the extension 11 terminates above the extension 20 and is maintained in spaced relation thereto through the medium of a vertically disposed bearing sleeve 21. A bar 19' is bolted to and extends parallel with the post 19a and said bar 19' at its lower end terminates in an inwardly directed projection 20' above the projection 20 which projection 20' is apertured and rests on the upper end of the bearing sleeve 21.

A pivot or steering bolt 23 is passed through the members 20', 11, 21, 20 and 17' for pivotally connecting the steering runner 15 to said extension 11.

A suitable brace 24 is bolted at its lower end as at 25 to the forward end of the bar 17' and at its upper end is provided with an offset extension disposed against the forward face of the post 19a. A bolt 26 passes through said extension and through the post 19 and bar 19' for securing the same together.

For actuating the steering runner 15 there is provided a pair of handle bars made from a single bar bent in a substantial U and including a pair of rearwardly extending arms 27—27 and a bight or connecting portion 28.

Intermediate its ends the bight or connecting portion 28 is bolted to the upper ends of the post 19a and bar 19' as at 29.

The ends of the arms 27 are offset outwardly from one another and at said ends are provided with suitable hand grips 30. Manifestly, by proper manipulation of the handle bars by one sitting in the seat 12, the steering runner 15 may be rotated in any desired direction for guiding the sled. Inwardly from its free end there is bolted or otherwise suitably secured to the tongue 11 a transversely disposed foot rest 31. The foot rest is of course in convenient reach of the legs of the operator upon the seat 12.

There is also provided a suitable braking apparatus for the sled and this braking apparatus comprises a rearwardly and downwardly extending bar 32 hinged at one end as at 33 to the tongue 11 rearwardly of the foot rest 31. The bar 32 at its free end terminates in a downwardly and rearwardly extending end portion 34 and at said end is provided with teeth 40 for biting engagement with the ground, or the packed snow for setting up a braking action upon the sled as is apparent.

The lower toothed end of the brake bar 32 is normally maintained out of engagement with the snow or ground through the medium of a spring 41 fixed at its forward end to the brake bar 32 and adjacent the free end of said bar and at its opposite end the spring is suitably anchored to the sled.

Adjacent its hinged end, the brake bar 32 is provided with a transversely disposed pedal or foot rest. As shown to advantage in Figure 3, the foot rest comprises a substantially elongated U-shaped bar 42 between the ends of which and engaged by said ends for retention on said bar 42 is a block 43 of any suitable material which block 43 intermediate its end is provided with a transverse groove 44 for accommodating the adjacent end portion of the tongue 11 as clearly suggested in Figure 1 when the brake bar 42 is held out of ground engaging position under action of the spring 41.

Obviously to apply the brake, the operator upon the seat 12 may place his feet upon the pedal 42 pressing downwardly on the pedal and moving the brake bar 32 upon its pivot against the action of the spring 41 for engagement with the ground or snow as is apparent.

It is thought that from the foregoing description, taken in connection with the accompanying drawings, a clear understanding of the operation, construction, utility and advantages of a sled of this character will be had by those skilled in this art without a more detailed description.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. A coaster sled comprising a platform, runners supporting the platform, a tongue projecting forwardly from the platform, a steering runner terminating at its forward end with a vertical extension, a bracket plate mounted vertically on the steering runner, a horizontal bar connecting said plate and said end extension, a post rising from said horizontal bar, a vertical pivot bolt connecting the free end of said tongue with an intermediate portion of said horizontal bar, and a sleeve circumjacent the bolt normally retaining the free end of said tongue in spaced relation to the horizontal bar, handle bars fixedly mounted on the upper end of said post, a seat, and a substantially inverted U-shaped bracket for supporting the seat above the platform, said bracket having one end fixed to said platform, and its other end fixed to said tongue.

2. A coasting sled comprising in combination a runner supported platform, a steering runner, a horizontal bar supported on said steering runner, a tongue projecting forwardly from said platform in a plane above said horizontal bar, a pivot bolt extending through said tongue and said horizontal bar, a spacer sleeve about said bolt between said tongue and horizontal bar, and a brake device pivotally supported on said tongue and swingable on an axis transverse to said tongue between adjacent ends of said platform and steering runner.

In testimony whereof I affix my signature.

JOSEPH A. BARTLEY.